Jan. 11, 1949.  F. A. FIRESTONE  2,458,771
SUPERSONIC REFLECTOSCOPE
Filed March 15, 1943  2 Sheets-Sheet 1

Inventor
Floyd A. Firestone
By Blackmore, Spencer & Flint
Attorneys

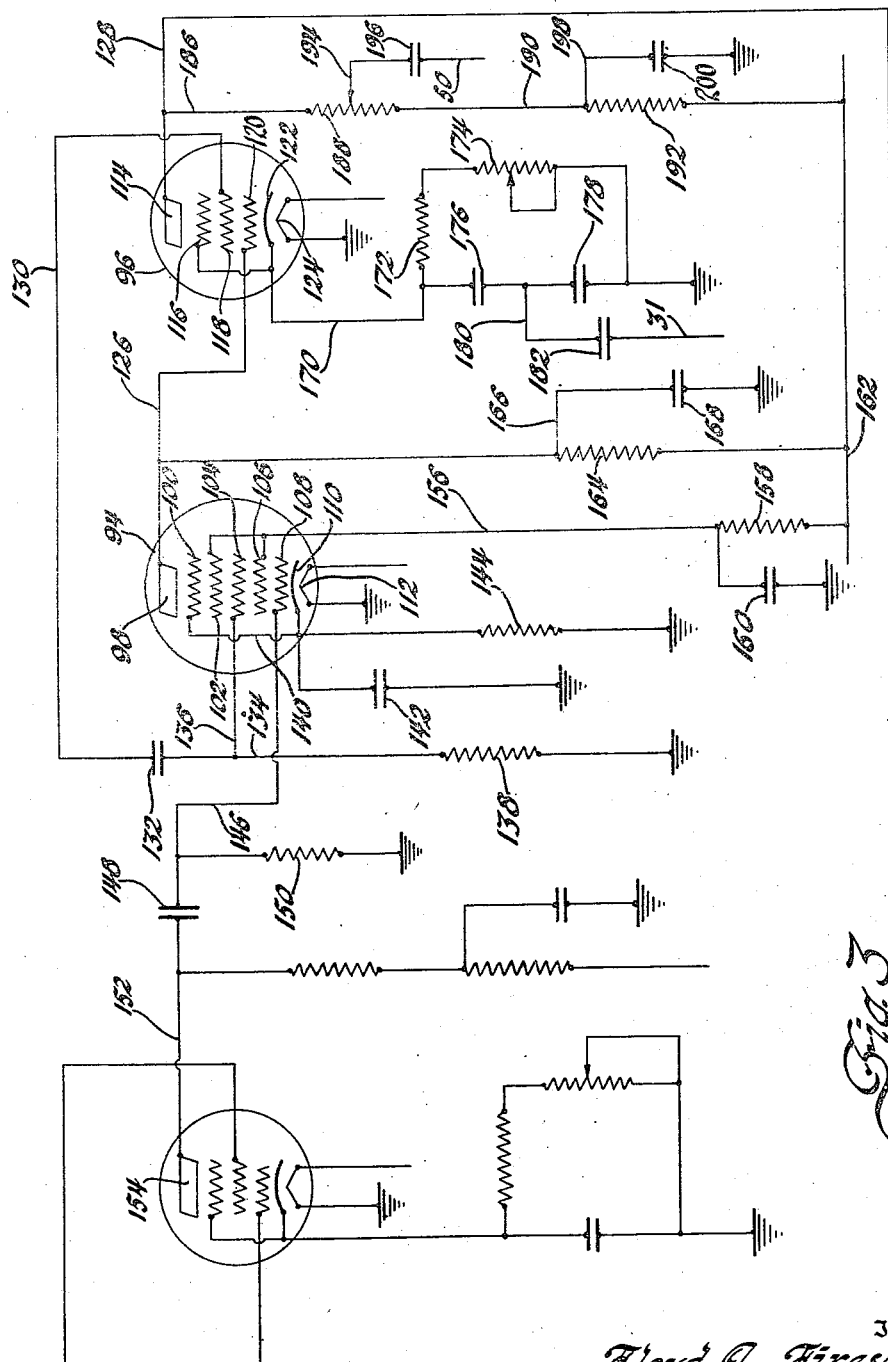

Patented Jan. 11, 1949

2,458,771

UNITED STATES PATENT OFFICE 2,458,771

SUPERSONIC REFLECTOSCOPE

Floyd A. Firestone, Ann Arbor, Mich., assignor to The Regents of the University of Michigan, Ann Arbor, Mich., a constitutional corporation Application March 15, 1943, Serial No. 479,228

9 Claims. (Cl. 315—26)

This invention relates to testing means or exploring means and more particularly to means for testing or exploring the internal structure of solid opaque bodies. It has long been a problem to provide some means for obtaining indications of the internal structure of an opaque solid body and to ascertain whether or not any flaws or faults are present therein. As an example, it is essential in some instances and useful in all to ascertain the structure of a metallic member where from an external examination the part may appear to be perfect but in reality actually have internal flaws or cracks due, for example, to cooling stresses. One method of detecting or locating internal cracks or holes in castings or other bodies is described in a prior patent granted to me, No. 2,280,226, dated April 21, 1942, entitled "Flaw detecting device and measuring instrument." As set forth in that patent, the method consists in sending high frequency vibrations or waves into the part to be inspected, receiving the reflected waves at predetermined points on the surface of the part and determining the time intervals involved in the dispatch and reception of the waves to indicate the position or location of the surface of reflection. These are fully described in my patent.

It will be obvious, however, that in dealing with high frequencies, such as for example one million cycles as mentioned in my patent, and the transmission of these waves over relatively short distances in the part to be tested, the time intervals to be dealt with will be very short. In order therefore to provide apparatus which can satisfactorily be used to measure these times and distances, I utilize a cathode ray oscilloscope and by applying known high frequencies to the linear sweep circuit, provide an expanded longitudinal base trace upon which may appear indicia marks made by the reflected or transmitted signal. This sweep circuit may be so adjusted as to trigger at the moment the signal is sent out or dispatched into the body or casting and thus forms the initial time point or zero mark. At some later point on this line a vertical mark will appear when the reflected signal returns and is picked up by the receiver. Since the speed of impressed waves through various materials is known, from the time interval that is required for the wave to go down into the metal or body and return, we may ascertain directly or convert this figure into distance. Thus if we find that in a casting 4" in thickness we obtain a reflected wave from a point 3" down, it is evident that there is a flaw or hole at that point at the 3" level. We will of course obtain at the same time a reflected wave from the 4" level, but this would be recognized as the lower surface of the casting.

Utilizing a cathode ray oscillograph, we have a substantially horizontal base trace whose beginning point is timed to synchronize with the signal initiation. We must therefore be able to measure along this horizontal trace a time interval to the point at which the reflected wave returns. Since the time intervals as pointed out previously are relatively small, it is necessary in order to sufficiently separate the different occurrences on this time base so that the same are not confused that the sweep speed must be high and in this instance as an example one speed utilized is eight millionths of a second for one horizontal trace. However, the screen of the cathode ray tube is relatively small and therefore if we only utilized a single horizontal trace the distance corresponding thereto would be relatively small. Therefore, in order to draw out or obtain a line corresponding to a useable distance, it is necessary to provide means for tracing several horizontal lines. This is done by providing a rapid snap return of the cathode ray to the side of the beginning trace and at the same time give a slight vertical displacement thereto whereby the next horizontal trace will lie slightly below the first and a plurality of these will extend down the screen of the tube and will give a horizontal trace of some length upon which signals may be impressed. At the lower end of this plurality of zigzag lines a vertical snap-back is provided to bring the trace back up to its initial position.

Having thus provided this horizontal trace of substantial length upon which to apply signals the same may be applied by connecting the voltage derived from the signal to the vertical displacement electrodes of the cathode ray tube. The pick-up or received voltage therefore is applied to the vertical plates of the oscillograph to give the trace a vertical displacement, dependent upon the voltage or signal received. The distance from the initiation of the horizontal sweep trace to the vertical displaced wave or index is a measure of the time required for the wave to go down into the casting and to be reflected to the point of pick-up, and thus a measure of the depth of the reflecting surface.

It is therefore an object of the present invention to provide a means for ascertaining the time required for certain wave travel and therefore the distance.

It is a further object of my invention to provide a visual scale for reading distance directly from the oscillograph tube.

It is a still further object of my invention to provide a visual scale directly on the horizontal sweep trace.

It is a still further object of my invention to apply a visual scale reading directly in distance in sufficiently small increments on the horizontal sweep beam.

It is a still further object of my invention to provide a visual scale on an oscillograph trace whose value can be changed.

With these and other objects in view which will become apparent as the specification proceeds, the embodiments of my invention will be best understood by reference to the following specification and claims and the illustrations in the accompanying drawings, in which:

Figure 3 is a circuit diagram showing in detail one of the index mark generators for controlling the system.

Figure 1:
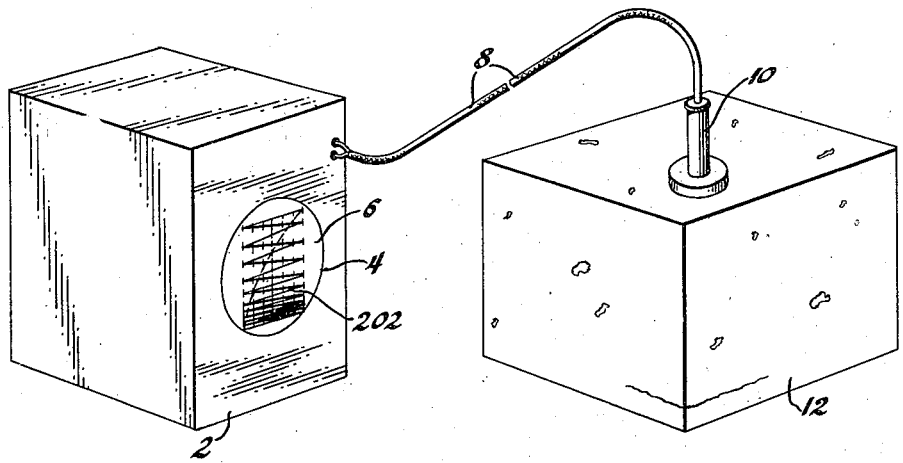
Figure 1 is a perspective view showing the main parts of my invention.

Referring now more specifically to the drawings, in Figure 1 there is shown a substantially large casing 2 which houses my system and has in one face thereof an opening 4 which encompasses a screen 6 of the cathode ray indicating tube. This casing also houses a generator for generating voltage waves of a frequency which can be projected as sound waves into a test piece. Both the receiver and transmitter mounted in the casing are connected by cable 8 with a manual test means 10 consisting of a piezo-electric crystal which may be applied to the surface of a test piece 12 which is being investigated. A system for controlling the cathode beam is illustrated diagrammatically by the various block diagrams shown in Figure 2 and consists of a master oscillator 14 which is set to generate waves of a frequency of approximately one million cycles per second. The large output of the oscillator is fed into a single self biased stage 16 whose grid is most of the time more negative than cutoff so that the stage acts both as a peaker and buffer and therefore the output of this stage only utilizes a portion of the positive peak of the waves generated by the oscillator.

The output of the peaker and buffer is fed into a series of control frequency dividers 18, 20, 22, 24, 26, and 28 whose oscillation frequencies are each integral sub-multiples of the frequency of the element preceding them in the series. These are the control circuits whose output eventually modulates the necessary indicia marks on the horizontal sweep trace, and controls the sweep frequency. A plurality of these control circuits are connected to a mixer 54 to provide differential emphasis of the indicia marks, the number of circuits being connected depending upon how many division marks it is desired to modulate or emphasize in different degrees. As an example, I have here shown four so connected which will emphasize four different division marks comprising the eight marks provided by the master oscillator. These connecting lines are shown at 44, 46, 48 and 50 and connect the first four control stages to the mixer. Switches 43, 45, 47 and 49 are provided in these lines to allow any one frequency or any combination to be used as desired. It is also desirable to provide a plurality of sweep frequencies to the horizontal plates of the oscilloscope and as many different frequencies may be provided as are deemed necessary. As an example, four different frequencies are herein shown as available. These are provided by a connection to a different part of the control stages and are connected to the last four control stages. Thus lines 30, 31, 33 and 35 extend from a connection on frequency dividers 22, 24, 26 and 28 to the amplifier 32. Each of these lines has a switch therein such as 21, 23, 25 and 27 so that any of the desired frequencies may be individually connected to the amplifier and to the horizontal plates of the oscilloscope. The amplifier is shown as connected by lines 34 and 36 with the horizontal plates 38 and 40 of the cathode ray tube 42. The output of said mixer is connected through line 56 to a modulator stage 58. The output of the oscillator 14 is also directly connected through line 60 with the modulator stage 58.

Input line 62 is connected to a conventional source of 60 cycle current and leads to a primary trigger stage 64 which controls a second mixer stage 66 through line 68. The output of the modulator 58 is connected through line 70 with one of the vertical deflecting electrodes 72 of the cathode ray tube and also through line 74 with the mixer 66. Line 76 connects line 36 with the primary trigger stage 64 and also the mixer 66. The output of the mixer stage is connected through line 78 with a sawtooth oscillator stage 80, the output of the same being connected through line 82 with an amplifier 84 whose output is connected across lines 86 and 88 which terminate in the vertical deflecting plates 72 and 90 respectively. The receiving device located in the manual handle 10 is connected through line 92 to line 88 and therefore this voltage is applied to the vertical deflecting plates.

There are two control features which it is desired to provide with this system: (1) sufficient horizontal trace speed so that the horizontal beam will sweep across the cathode ray tube screen at a rate sufficient to horizontally space the indicia marks so they will be easily discernible, and (2) to provide on this zigzag horizontal sweep a plurality of definite indicia or index marks which while they indicate time intervals will correspond to different distances, depending upon the material which is being tested. The oscillator therefore is connected directly to the modulator 58 through line 60 in order to apply its frequency of one million cycles per second to the vertical deflecting plates 72 and 90 to provide the vertical index marks.

The output of the oscillator 14 after it passes through the peaker and buffer 16 is applied to the first control stage 18 which divides the frequency in half, the frequency of the output of this stage therefore being one-half million cycles. Each one of these control stages operates in exactly the same manner and therefore the frequency output of the stage 20 would be 250,000 cycles per second; the output of stage 22 would be 125,000 cycles per second; the output of stage 24 would be 62,500 cycles per second; the output of stage 26 would be 31,225 cycles per second; and the output of stage 28 would be 15,612½ cycles per second.

Each of these control stages is substantially the same and therefore a detailed description of only one of these will suffice for all. Figure 3 shows in detail the construction of one of these circuits and therein are shown two tubes 94 and 96, tube 94 consisting of a plate 98, grids 100, 102, 104, 106 and 108, cathode 110 and heater 112.

Tube 96 consists of plate 114, grids 116, 118 and 120, cathode 122 and heater 124. The plate 98 of the tube 94 is connected through line 126 to the control grid 120 of the tube 96. The plate of the tube 96 is connected through line 128 to the next series control stage and through line 130 to a condenser 132 and thence through lines 134 and 136 to grid 104 of the tube 94. Line 134 extends to resistor 138 and thence to ground. Grid 100 of the tube 94 is connected through line 140 to condenser 142 and resistor 144, in parallel and to the cathode 110. Grid 108 of the tube 94 is connected through line 146 to one side of a condenser 148 and also to one terminal of a resistor 150 which is grounded. The opposite side of the condenser 148 is connected through line 152 to the plate 154 of the tube of the previous stage of control stages.

Grid 102 of the tube 94 is connected through line 156 to one side of a resistor 158 which is in parallel with a condenser 160. The opposite side of the condenser is grounded, but the opposite side of the resistor is connected to line 162. Connected across lines 126 and 162 is a resistor 164 which has connected to one terminal thereof a line 166 connected to condenser 168 and to ground. Grid 116 of the tube 96 is connected to cathode 122 and through line 170 to a resistor 172 in series with a second variable resistor 174, both of which are in parallel with two condensers 176 and 178. A tapped line 180 extending from between the two is connected to a further condenser 182, the opposite side of which extends through line 31 to control apparatus for the horizontal sweep. Extending from line 128 in the plate circuit of the tube 96 is a line 186 connected to a resistor 188 whose opposite terminal is connected through line 190 to a second series resistor 192 which is connected to line 162. A variable tap 194 on the resistor 188 is connected to a condenser 196 and thence to line 50 to mixer 54 to provide the index marks at this frequency. Line 198 from one terminal of resistor 192 is connected to a condenser 200 whose terminal is grounded.

The operation of this control circuit is as follows, assuming of course that the necessary voltages have been applied to the tube elements. The voltage provided for sweeping the horizontal beam from the control systems is derived from line 31 and therefore is taken off across condenser 178 in the cathode circuit of the tube 96. When the combination of condensers 178 and 176 is charged to a voltage higher than that on the grid 120, the cathode is at a higher potential than the grid and current flow through the tube 96 ceases. The condenser then stops charging and at once starts to discharge through the resistances 172 and 174 which are across the same. The discharge current of the condenser through the resistances decreases exponentially with time. Over a short initial section of the discharge, the decrease is nearly linear and it is this initial linear drop that provides one horizontal section of the sweep cycle. During this discharge period tube 94 has been passing current and its plate current passing through resistance 164 reduces the voltage of grid 120 of tube 96 below the former value. As the condensers 178 and 176 continue to discharge, the voltage thereon falls below the voltage of the grid 120 and at some definite voltage fixed by tube characteristics and operating voltages, tube 96 will again pass current.

As soon as the plate current in this tube flows, the voltage of the plate drops. This reduction in plate voltage results in a decrease in the grid voltage of tube 94 through the coupling condenser 132. The reduced grid voltage of tube 94 reduces the plate current of tube 94 and the decreased current flow through resistor 164 increases the grid voltage on grid 120. As a result there is a rapid increase in the plate current of tube 96 and the condensers 178 and 176 charge very rapidly. As they charge, the voltage thereacross rises, thus decreasing the flow of plate current in tube 96 and resulting in an increase in plate voltage on plate 114 because of the decreasing drop across resistor 188 and 192. This rise in plate voltage 114 again affects the grid potential on grid 104, increasing the plate current on plate 98 and thus decreasing the plate voltage thereon which is impressed on the grid 120 of the tube 96. This decrease in plate voltage 98 together with the increase of condenser voltages 178 and 176, very quickly blocks the flow of current through tube 96 and another cycle is ready to begin.

Figure 2:
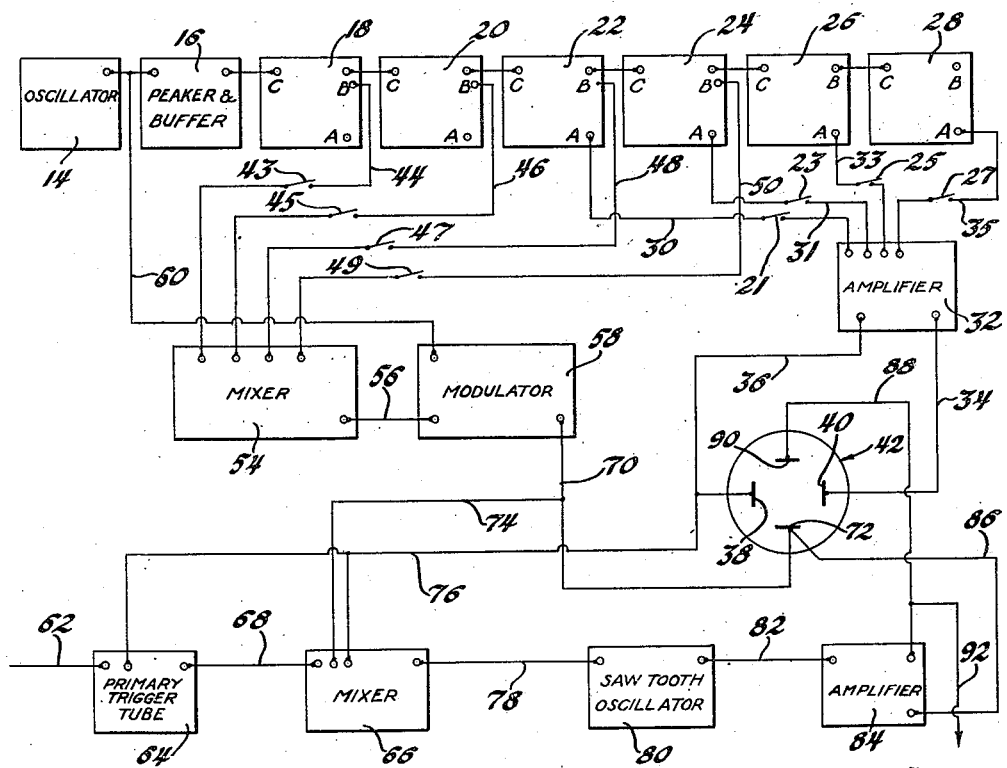
Figure 2 is a block diagram showing the main parts of my indicating test system.

This interaction between the plate voltage of 96 and the grid voltage of 94, and between the plate voltage of 94 and the grid voltage of 96, results in a very rapid increase and decrease in the plate current of tube 96. The complete increase and decrease takes place during the snap-back period of the sweep cycle and it is during this very short interval that the electron stream of the cathode ray tube is returned from the right-hand to the left. By selecting the proper values of condensers and discharge resistors, the desired sweep frequency can be obtained. When the time constant of the control stage is approximately a sub-multiple of the driving frequency, the control stage will lock in synchronization at exactly a sub-multiple of this driving frequency. For proper functioning of the oscilloscope, the sweep frequency must be this exact sub-multiple of the fundamental frequency and in this instance I utilize a one-half ratio of the frequency fed in, that is, each control stage divides the frequency input in half and therefore synchronizes the system satisfactorily. Thus if the voltage on line 31 from one of these control systems is applied to the horizontal deflecting plates 38 and 40 of the oscilloscope, the horizontal beam will be deflected across and back at a speed depending upon the frequency of the output of this particular control system. If we desire a high speed, the output of control system 18 may be utilized, or if we desire a lower speed, the outputs of one of the sub-multiple systems can be used. Thus we can select a horizontal sweep speed best suited to the dimensions of the piece to be examined. The smaller the dimension, the higher frequency necessary in order to obtain proper horizontal spacing. As illustrated in Figure 2, these various sweep speeds are provided from terminal A of the control stages 22, 24, 26 and 28, the voltages being applied to amplifier 32 by actuation of the switches 21, 23, 25 and 27.

In order to obtain index marks at a plurality of points along the horizontal sweep to allow the operator to ascertain visually the location of the reflected wave, certain of the control stages also provide periodic timed impulses of different multiple or sub-multiple frequencies to modulate the high frequency indicia marks applied by oscillator 14 to modulator 58. Any number of these synchronized impulses of different frequencies can be applied to provide a useable scale and in this instance as an illustration four of these control stages have been shown connected in this manner. These four, 18, 20, 22 and 24, have their terminals B connected to the mixer 54 and the timed impulses may be applied to the mixer by actuation of switches 43, 45, 47 and 49. This voltage comes from the plate circuit of the second tube in each control stage such as plate 114 in the example shown in Figure 3 and is taken off across a variable resistor such as that shown connected to line 50.

It is therefore possible by using these four control stages in addition to the high frequency as provided by the master oscillator to apply vertical index marks along the horizontal sweep of five different amplitudes. Therefore, if for example, it was desired to amplify index marks $1/125000$ of a second part, the operator would close switch 49 and the voltage upon the plate of the second tube of stage 24, which stage in this illustration has a frequency of 125,000 C. P. S., would be applied to the mixer, then to the modulator and lastly to the vertical plates of the oscilloscope and at each timed interval would provide an emphasized or amplified vertical mark on the trace. If these marks were too far apart for the particular test being run, the operator could emphasize marks at one-half intervals between those then on the trace by closing switch 47 which introduces a frequency twice that of stage 24 and therefore we would have twice as many amplified index marks. The amplified indicia could be increased until all of the switches are closed. By varying the resistance 188 in each stage, certain indicia may be emphasized more than others so that as a final result the indicia marks on the horizontal trace may assume the approximate appearance of a ruler in which the inch marks are longer than the half inch marks, which in turn are longer than the quarter inch marks, etc.

The disclosure above has mentioned as an illustration the use of sub-multiples of one-half in each stage, that is, the frequency of each control stage in descending order is one-half that of the previous stage. This is a convenient ratio where it is desired to provide a scale such as our inch scale which is divided in eighths. However, any other ratio may be provided by changing the constants of the control stages, such, for example, as one-fifth in case it is desired to separate the scale into tenths or any other ratio, the said constants permitting the stage to pass only every fifth impulse. The next control stage would then again be one-half and a tenths scale would be provided.

In order to provide the standing wave form as it is shown at 202, a sixty cycle wave is provided from a suitable source and fed into line 62 which controls the primary trigger tube 64. The output of this trigger tube is connected to the mixer 66 to which it will be noted is also connected the output of the modulator 58 and also a connection to the amplifier 32 so that all of these waves may be used to synchronize the sawtooth oscillator, which therefore fires in approximately the same portion of each cycle of the sixty cycle wave, the exact instant being when a certain indicia mark is being formed at a predetermined portion of the horizontal sweep. The sixty cycle current of course triggers the impulse to give one complete series of waves or zigzag traces down the face of the tube and each $1/60$ of a second the trace completes a downward moving zigzag and a snapback.

There are three timing periods which must be synchronized or interlocked so that the resultant picture appearing on the head of the cathode ray tube is clear-cut and not blurred or fuzzy. It is first necessary to understand that this picture is composed of a trace on a fluorescent screen which trace is repeated in such a short period of time that to the eye of the observer it appears to be a continuous line. Since this repetition occurs, if by any chance the timing of the second or any one of the later traces is not accurate and therefore the later trace does not fall exactly on top of a previous trace due to such timing inaccuracy, the appearance of the line will broaden or perhaps even become blurred inasmuch as the eye sees a series of these lines not perfectly synchronized at one time. Therefore one of the primary objects is to so time and synchronize all of these various traces so that each will exactly overlie the previous traces and give a single clear-cut line in the resultant diagram. Further, this diagram or trace is composed of a number of lines whose longitudinal position thereupon is controlled in turn by different frequencies. That is, on the horizontal traces or sweeps a certain time period is defined as that in which the spot or trace moves across the screen or head in one direction which is immediately followed by a return to the opposite side of the head in a much shorter period of time. Thus, the horizontal control produces a zigzag line on the head of the tube. These traces would fall exactly on top of each other unless some biasing means was applied to the vertical plates to cause a gradual movement of the same down the face of the tube. This tracing action in a horizontal direction takes place at a very high rate of speed and depends on the material being tested, these different materials requiring different speeds in order to obtain the proper scale of measurement.

At the same time there must be a series of short vertical marks indicating a definite repetitive time period in order to provide measuring indicia for the operator. These must of course be synchronized with the series of horizontal sweep circuits and again must be locked to that frequency so that they appear in exactly the same position for each repetitive trace. Further, after the horizontal trace has zigzagged down the face of the cathode ray tube there must be some means provided to return it to its upper or starting point so that the same process may be repeated. This is accomplished by the sixty cycle current fed in on line 62. Again, any variation in the disposition of the whole picture for each complete time period would cause blurring and this therefore must be interlocked accurately with the horizontal sweep frequency and the indicia applying frequency. There are therefore three frequencies that must be interlocked; namely, the horizontal sweep frequency, the vertical indicia signal frequency or frequencies, both of which originate in the oscillator 14 and the sixty cycle frequency introduced through line 62. These three frequencies are therefore fed to the mixer 66 which acts as an interlocking agent for all three. Sixty cycle power is fed in on line 62 to the primary trigger tube 64. Superimposed upon this sixty cycle control voltage is the horizontal sweep voltage which is fed thereto through line 76. Tube 64 therefore fires at a certain phase of the sixty cycle voltage. The exact instant of firing, however, is controlled by the superimposed horizontal sweep voltage which may be of a frequency of the order of ten thousand cycles per second, or higher. Trigger tube 64 may be a gas-filled tube and once triggered its output continues for a considerable fraction of the sixty cycle period. The sawtooth oscillator 80 which produces the vertical sweep is triggered through line 78 from the mixer 66 which it will be seen receives its sixty cycle pulse through connection 68, the inch mark or vertical indicia voltages from connection 74 and the horizontal sweep voltages through connection 76. By proper mixing of these various voltages the sawtooth oscillator 80 will fire when a certain inch mark is being produced at the bottom of pattern 202 in a given phase of the horizontal sweep and a given phase of the sixty cycle power. Therefore the inch marks, horizontal sweep and vertical sweep are locked together and synchronized with the sixty cycle power with a result that the pattern 202 appears to be exactly stationary. This equipment is therefore provided to eliminate the blur or fuzziness appearing on the cathode ray head.

All of the aforesaid system it will be evident is provided in order to establish upon the face of the cathode ray tube an elongated zigzag trace which, through metals, is equivalent to approximately a distance of thirty feet so that articles having dimensions up to this figure may be tested, and applying to this zigzag horizontal trace a series of vertical indicia marks so that distances may be read directly from the cathode ray screen. As soon as any signal is dispatched from the crystal in contact with an article to be tested such as block 12, the actuating and received wave impulses are applied to line 92 and thus to the vertical plates and will cause vertical marks in addition to the index marks at various points on the trace and by being able to measure the distance or time between the initiated and the reflected wave, the operator is able to tell the exact position from which the wave was reflected and if this is not one of the larger dimensions of the piece he is aware that there is some flaw or hole in the same and that in all probability the piece is not structurally satisfactory. Since waves are also reflected from the opposite dimension or face, my invention may also be used to measure the dimensions of a part.

I claim:

1. In indicating means, a cathode ray tube having vertical and horizontal beam deflecting plates, a master oscillator, a plurality of frequency divider circuits connected in series and to the oscillator to provide frequencies which are sub-multiples of the master oscillator frequency, means for selectively connecting one of said frequency divider circuits to the horizontal deflecting plates, means for connecting one or more of the frequency divider circuits to the vertical deflection plates, and voltage regulating means in each connector line of the last mentioned connecting means whereby the relative value of the voltage applied by that frequency divider circuit may be varied.

2. In indicating means, a cathode ray tube having vertical and horizontal deflecting plates, a master oscillator, a plurality of frequency divider units serially connected in cascade to said oscillator output, a pair of tubes in each unit, conductors extending from the cathode of each output tube of a group of units to the horizontal deflection plates, and conductors extending from the plate circuit of each output tube of a second group of units to the vertical deflecting plates to provide a synchronized beam pattern.

3. In indicating means, a cathode ray tube having vertical and horizontal deflecting plates, a master oscillator, a plurality of frequency divider units serially connected in cascade to said oscillator output, a pair of cross-connected tubes in each unit, conductors extending from the cathode of each output tube of a group of units to the horizontal deflection plates, conductors extending from the plate circuit of each output tube of a second group of units to the vertical deflecting plates to provide a synchronized beam pattern, and switching means in both sets of conductors to control the flow of current as desired.

4. In indicating means, a cathode ray tube having vertical and horizontal deflecting plates, a master oscillator, a plurality of frequency divider units serially connected in cascade to said oscillator output, a pair of cross-connected tubes in each unit, conductors extending from the cathode of each output tube of a group of units to the horizontal deflection plates, conductors extending from the plate circuit of each output tube of a second group of units to the vertical deflecting plates to provide a synchronized beam pattern, a portion of the frequency divider units being common to both sets of conductors.

5. In indicating means, a cathode ray tube having vertical and horizontal deflecting plates, a master oscillator, a plurality of frequency divider units serially connected in cascade to said oscillator output, a pair of cross-connected tubes in each unit, conductors extending from the cathode of each output tube of a group of units to the horizontal deflection plates, conductors extending from the plate circuit of each output tube of a second group of units to the vertical deflecting plates to provide a synchronized beam pattern, and adjustable means in the plate circuits of each unit to relatively adjust the output of each plate circuit.

6. In indicating means, a cathode ray tube having vertical and horizontal deflecting plates, a master oscillator, a plurality of frequency divider units serially connected in cascade to said oscillator output, a pair of cross-connected tubes in each unit, conductors extending from the cathode of each output tube of a group of units to the horizontal deflection plates, conductors extending from the plate circuit of each output tube of a second group of units to the vertical deflecting plates to provide a synchronized beam pattern, and a low frequency source of current connected to the horizontal deflecting plates to provide a standing wave.

7. In indicating means, a cathode ray tube having vertical and horizontal deflecting plates, a master oscillator, a plurality of frequency divider units serially connected in cascade to said oscillator output, a pair of cross-connected tubes in each unit, conductors extending from the cathode of each output tube of a group of units to the horizontal deflection plates, conductors extending from the plate circuit of each output tube of a second group of units to the vertical deflecting plates to provide a synchronized beam pattern, a low frequency source of current connected to the deflecting plates to provide a standing wave, and a sawtoothed wave generator connected to the low frequency source to control the point of initiation of the combined wave and maintain the same constant to prevent blur.

8. In indicating means, a cathode ray oscilloscope, horizontal and vertical deflecting plates thereof, an oscillator, a plurality of frequency divider circuits connected serially and to said oscillator, means for selectively connecting the horizontal plates to the output of a frequency divider circuit, a modulator connected to the oscillator output to receive voltage therefrom, means for selectively connecting one or more divider circuits to the modulator to modulate the oscillator voltage which appears in the modulator output and means connecting the modulator output to the vertical deflecting plates whereby various frequencies applicable to the horizontal plates will provide different sweep frequencies and the different modulated wave forms of the voltage applied to the vertical deflector will provide selectable patterns of index marks.

9. In indicating means, a cathode ray tube having vertical deflectable beam means therein, means to portray the vertical motion of said beam as a function of time, an oscillator, a plurality of frequency divider circuits connected serially and to the oscillator, a modulator connected directly to the output of the oscillator and selectively to the frequency divider circuits, means connecting the output of the modulator to the vertical beam deflecting means, and voltage varying means interposed between the frequency divider circuits and the modulator to provide different intensities of modulating voltage at different frequencies.

FLOYD A. FIRESTONE.

REFERENCES CITED

The following references are of record in the file of this patent:

UNITED STATES PATENTS

| Number | Name | Date |
| --- | --- | --- |
| 2,050,059 | Koch | Aug. 4, 1936 |
| 2,052,183 | Lewis et al. | Aug. 25, 1936 |
| 2,121,359 | Luck et al. | June 21, 1938 |
| 2,132,655 | Smith | Oct. 11, 1938 |
| 2,178,074 | Jakel et al. | Oct. 31, 1939 |
| 2,208,378 | Luck | July 16, 1940 |
| 2,232,044 | Bedford | Feb. 18, 1941 |
| 2,234,830 | Norton | Mar. 11, 1941 |
| 2,236,532 | Gibbs | Apr. 1, 1941 |
| 2,237,651 | Bruche | Apr. 8, 1941 |
| 2,256,085 | Goodale | Sept. 16, 1941 |
| 2,275,460 | Page | Mar. 10, 1942 |
| 2,280,572 | Farnsworth | Apr. 21, 1942 |
| 2,284,064 | Morgan | May 26, 1942 |
| 2,292,045 | Burnett | Aug. 4, 1942 |
| 2,304,813 | Gibbs et al. | Dec. 15, 1942 |
| 2,312,761 | Hershberger | Mar. 2, 1943 |
| 2,314,920 | Bumstead | Mar. 30, 1943 |
| 2,368,449 | Cook | Jan. 30, 1945 |
| 2,405,238 | Seeley | Aug. 6, 1946 |

Certificate of Correction

Patent No. 2,458,771. January 11, 1949.

FLOYD A. FIRESTONE

It is hereby certified that error appears in the printed specification of the above numbered patent requiring correction as follows:

Column 7, line 16, for the words "a second part" read *a second apart*;

and that the said Letters Patent should be read with this correction therein that the same may conform to the record of the case in the Patent Office.

Signed and sealed this 31st day of May, A. D. 1949.

[SEAL]

THOMAS F. MURPHY,
*Assistant Commissioner of Patents.*